April 28, 1925.
O. A. COLBY
1,535,578
CORD SUPPORT
Filed April 13, 1922
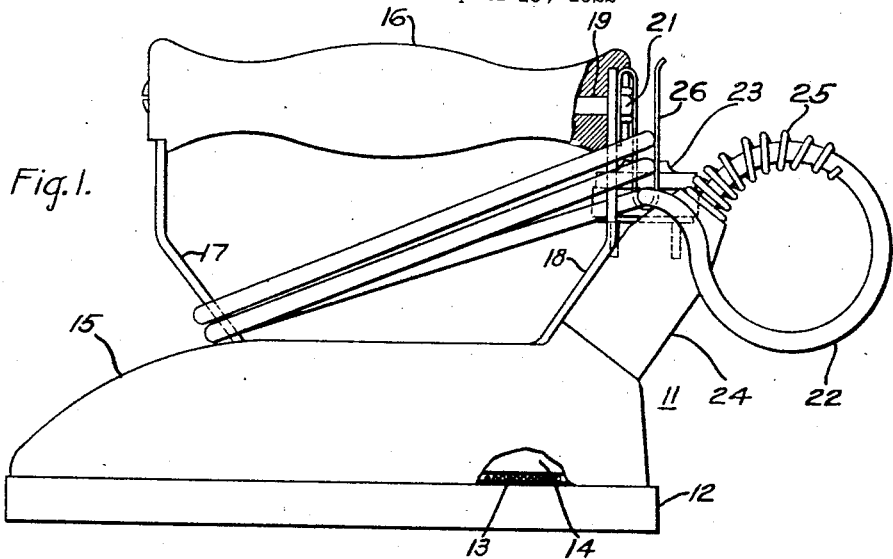
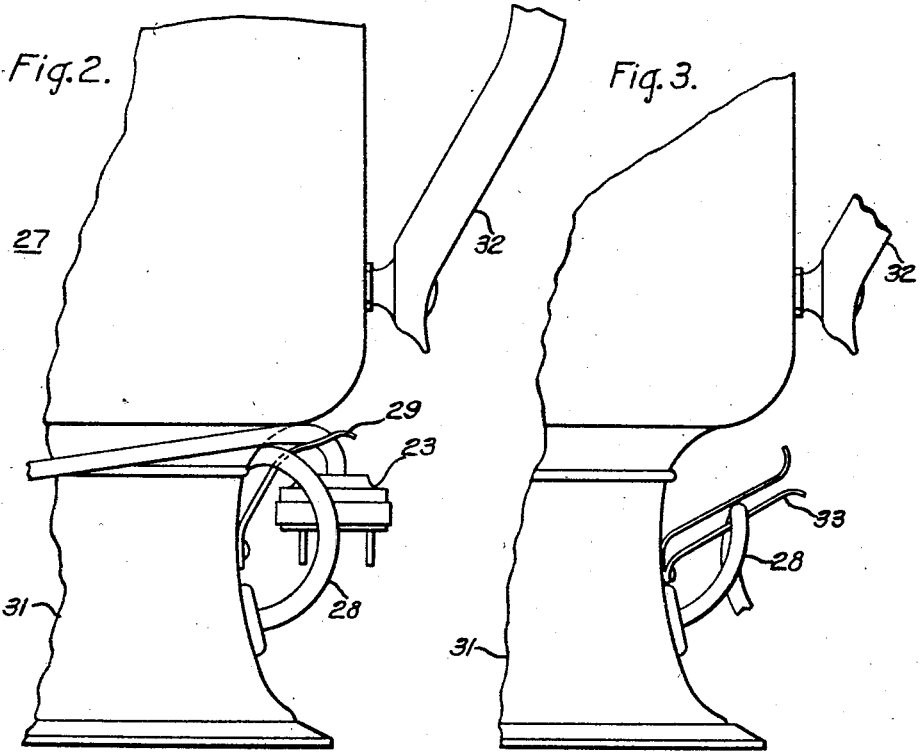
INVENTOR
Ora A. Colby.
BY
ATTORNEY
WITNESSES:

Patented Apr. 28, 1925.

1,535,578

UNITED STATES PATENT OFFICE.

ORA A. COLBY, OF IRWIN, PENNSYLVANIA, ASSIGNOR TO WESTINGHOUSE ELECTRIC & MANUFACTURING COMPANY, A CORPORATION OF PENNSYLVANIA.

CORD SUPPORT.

Application filed April 13, 1922. Serial No. 552,180.

*To all whom it may concern:*

Be it known that I, ORA A. COLBY, a citizen of the United States, and a resident of Irwin, in the county of Westmoreland and State of Pennsylvania, have invented a new and useful Improvement in Cord Supports, of which the following is a specification.

My invention relates to electrically-heated apparatus and particularly to portable electrically-heated household appliances and it has for its object to provide a relatively simple means for supporting an electrical cord on the appliance with which it is operatively associated and to which it is permanently connected.

Heretofore, portable electrically heated household appliances, such as percolators and flat irons, have been provided with removable cords having socket plugs for engaging contact terminal pins carried by the appliances. This arrangement permitted of interrupting the circuit by removing the plug of the appliance whenever desired or necessary and the appliance could then be handled without the cord being attached thereto. If a non-removable cord is employed, the terminal construction of the appliance is greatly simplified but it becomes necessary to make provision for the cord to prevent it interfering with the manipulation or the handling of the appliance during normal use and also when it is stored for future use.

In practising my invention, I provide a resilient clip secured to an electrically-heated appliance for receiving and retaining the cord, which is wound around the appliance. The cord may be of such length that, when so wound around the device, the connecting plug at the end thereof is located relatively close to the supporting clip. If desired, the length of the cord permanently attached to the appliance may be made relatively short and be provided with a small connector plug or socket for connection to a longer cord, provided, at one end, with a co-operating socket or plug and, at its other end, with a suitable plug for connection to a source of energy.

In the single sheet of drawings,

Figure 1 is a view, in side elevation, with certain parts cut away, of an electric iron comprising the device embodying my invention;

Fig. 2 is a partial view, in side elevation, of an electric percolator comprising the device embodying my invention;

Fig. 3 is a partial view, in side elevation, of an electric percolator comprising a modification of the device embodying my invention;

Fig. 4 is a view of a conductor cord employed with the device embodying my invention.

An electric iron, designated generally by the numeral 11, comprises a sole or working plate 12, a heating element 13, a top plate 14 and a cover member 15. The heating element 13 may be of any suitable or desired construction usually employed in the art and, as it forms no part of my invention, is not further described. The heating element 13 and the top plate 14 may be clamped against the bottom plate 12 in any suitable or desired manner and, as this feature is not part of my invention, it is not further described. The sole plate 12, the heating element 13 and the top plate 14 constitute what may be termed the body portion of the iron.

A handle 16 is suitably supported on the cover member 15 by a pair of handle straps 17 and 18, the lower ends of which are suitably mounted on, and secured against, the top of the cover member 15 by any suitable means (not shown). A bolt 19 is located within the handle member 16 and extends through suitable openings in the top end of each of the handle straps 17 and 18, a nut 21 being provided at one end of the bolt 19 to permit of tightly clamping the upper ends of the handle straps 17 and 18 against the ends of the handle 16.

A supply-circuit conductor 22 is provided to conduct current from a suitable source of supply (not shown) to the heating element 13, being provided at its outer end with a suitable plug member 23 of such construction as to permit of its co-operating with a socket member (not shown) connected to the supply of energy. The inner end of the supply-circuit conductor 22 may be located within a suitable terminal casing 24 which is mounted at the back of the iron 11 and which may be held against the handle strap 18 by suitable means (not shown) in any desired manner usually employed in the art. In order to prevent undue kinking or bending of the conductor 22, I may provide a suitable spring member 25, of substantially helical shape, the inner end of which extends into, and is held by, the upper end portion of the terminal casing.

In order to provide a resilient member for supporting the conductor 22 at intervals of its length I mount a relatively thin spring clip 26, of substantially U-shape, adjacent the upper end of the rear handle strap 18. By providing a suitable opening through a down-turned end portion of the member 26, it may be clamped against the outer surface of the upper part of the handle strap 18 by the head of the bolt 19, a construction which serves to maintain the member 26 in its proper operative position.

When it is desired to store away the iron for future use it is only necessary to coil the cord 22 around the front handle strap immediately adjacent the top of the cover member 15 and around the rear handle strap, placing the cord in the clip 26, employing a sufficient number of turns to coil all of the length of the cord 22 on the iron and bringing the terminal member 23 closely adjacent to the supporting clip 26.

An electrically heated percolator, designated generally by the numeral 27, may be of any suitable or desired shape and construction and only those details relating particularly to the device embodying my invention will be herein described. A non-removable conductor cord 28 may be of any suitable or desired length and to be provided, at its outer end, with a terminal plug member 23 and have its end connected to a heating element (not shown) located inside the percolator. A resilient spring clip 29 may have one end suitably secured against the outer surface of the base 31 of the percolator immediately below a handle member 32 and be so spaced from either the base or the body portion of the percolator as to receive and clamp the conductor 28.

If desired, I may employ a spring clip 33 bent to substantially U-shape and having its lower end suitably secured against the base 31 of the percolator, substantially as illustrated in Fig. 3 of the drawing, thus permitting of locating the supporting member 33 in any position on the base.

Referring more particularly to Fig. 4 of the drawing, I there illustrate a construction of conductor cord and connecting plugs which may be advantageously employed with portable electrically heated devices, particularly electric percolators. The length of the cord 28 is made just sufficient to permit of coiling it a single time or turn around the base of the percolator and bring the terminal member 23 relatively close to the supporting clip 29 or the clip 33, as the case may be. I provide a longer cord 34 having, at its inner end, a plug member 35 adapted to co-operate with the member 23 and having, at its outer end, a suitable plug member 36, here illustrated as an Edison plug, to permit of its being screwed into the usual Edison socket, connected to a suitable supply of energy in the usual manner. This construction has the advantage that the plug member 35, together with its heater cord 34, may be disengaged from the member 23, after which the cord 28 may be coiled around the base 31 of the percolator, permitting of handling the percolator 27 without having a long cord depending therefrom. If a plurality of such devices or a number of different household appliances are each provided with the same type of co-operating members 23 and 35, it is possible to use the cord 34 interchangeably on any one of the appliances, thus permitting of energizing any one of the appliances, even if the cord originally provided therewith is not immediately available.

While I have illustrated only a single supporting clip on an electric iron in Fig. 1, I do not desire to be limited thereto, as, obviously, I may place a second clip at the front end of the handle and wind the coil thereon. It is also obvious that, instead of providing a length of conductor cord on an appliance of sufficient length to permit of encircling the device once, this is not necessary and only a sufficient length permanently attached to the appliance may be provided to extend from the base to and through the supporting clip, and all of these modifications are intended to be included.

Various modifications may be made in the device embodying my invention without departing from the spirit and scope thereof and I desire that only such limitations shall be placed thereon as are imposed by the prior art or are specifically set forth in the appended claims.

I claim as my invention:

1. A portable electrically-heated apparatus comprising a body portion, a heating element, a permanently attached electric circuit conductor, and means carried by said body portion for releasably supporting all of said conductor when said apparatus is not in use.

2. A portable electrically-heated apparatus comprising a body portion, a heating element, an electric circuit conductor permanently connected to said heating element, and a resilient member, operatively associated with said body portion, for releasably supporting said conductor.

3. A portable electrically-heated apparatus comprising a body portion, a heating element, an electric circuit conductor permanently connected to said heating element, and a resilient member, operatively associated with said body portion, for releasably supporting said conductor when coiled around said apparatus.

4. A portable electrically-heated apparatus comprising a body portion, a heating element, an electric circuit conductor permanently connected to said heating element, and a resilient member, operatively associated with said body portion, for releasably supporting said conductor at a plurality of points intermediate its ends.

5. A portable electrically-heated apparatus comprising a body portion, a heating element, a permanently attached electric circuit conductor, and means carried by said body portion for releasably supporting all of said conductor by said body portion when said apparatus is not in use.

In testimony whereof, I have hereunto subscribed my name this 11th day of April, 1922.

ORA A. COLBY.